United States Patent
Schipper et al.

[11] Patent Number: 5,917,445
[45] Date of Patent: Jun. 29, 1999

[54] GPS MULTIPATH DETECTION METHOD AND SYSTEM

[75] Inventors: Brian W. Schipper, Brooklyn Park; Suneel I. Sheikh, Minneapolis; Lawrence C. Vallot, Shoreview, all of Minn.

[73] Assignee: Honeywell Inc., Minneapolis, Minn.

[21] Appl. No.: 08/775,501

[22] Filed: Dec. 31, 1996

[51] Int. Cl.[6] .............................. H04B 7/185; G01S 5/02
[52] U.S. Cl. ............................................ 342/357; 701/213
[58] Field of Search ........................... 342/357; 701/213, 701/214

[56] References Cited

U.S. PATENT DOCUMENTS

| | | | |
|---|---|---|---|
| 4,384,293 | 5/1983 | Deem et al. | 343/113 R |
| 4,719,469 | 1/1988 | Beier et al. | 342/434 |
| 4,894,662 | 1/1990 | Counselman . | |
| 4,963,889 | 10/1990 | Hatch | 342/357 |
| 5,021,792 | 6/1991 | Hwang | 342/357 |
| 5,072,227 | 12/1991 | Hatch | 342/357 |
| 5,119,101 | 6/1992 | Barnard | 342/357 |
| 5,185,610 | 2/1993 | Ward et al. | 342/357 |
| 5,450,448 | 9/1995 | Sheynblat | 342/358 |
| 5,471,217 | 11/1995 | Hatch et al. | 342/357 |
| 5,526,291 | 6/1996 | Lennen | 342/358 |
| 5,534,875 | 7/1996 | Diefes et al. . | |
| 5,543,804 | 8/1996 | Buchler et al. | 342/357 |
| 5,548,293 | 8/1996 | Cohen . | |
| 5,563,917 | 10/1996 | Sheynblat | 342/358 |

FOREIGN PATENT DOCUMENTS

0609935  8/1994  European Pat. Off. .

*Primary Examiner*—Theodore M. Blum
*Attorney, Agent, or Firm*—John G. Shudy, Jr.

[57] ABSTRACT

A multipath detection method for use in a GPS position determination system includes providing a code pseudorange measurement representative of a range of an antenna to a space vehicle and a carrier phase pseudorange measurement representative of the range of the antenna to the space vehicle. A code-carrier measurement difference is then generated between the code pseudorange measurement and the carrier phase pseudorange measurement. This code-carrier measurement difference is examined to determine if a multipath component is present. If, the difference indicates that multipath is likely to be present, use of such measurements in computing position solutions, such as attitude solutions, is avoided. A multipath detection system for carrying out the method is also described.

14 Claims, 5 Drawing Sheets

GPS MULTIPATH DETECTION METHOD AND SYSTEM

FIELD OF THE INVENTION

The present invention relates to GPS position and attitude determination systems. More particularly, the present invention relates to the detection of multipath errors affecting GPS position and attitude determination systems.

BACKGROUND OF THE INVENTION

Generally, the Global Positioning System (GPS) provides basically two fundamental quantities from each available GPS satellite, e.g., space vehicle (SV). These two fundamental quantities include a pseudorange measurement and SV position. While GPS, itself, is commonly thought of as a position determination system, the pseudorange measurements are actually processed to compute delta positions, i.e., a change or difference in one position with respect to a second position. Such computations are made after receipt of GPS signals from one or more GPS SVs by one or more GPS antenna/receiver sets. The two positions may be, for example, a current position with respect to a previous position, a position of one antenna with respect to another antenna at one particular time (or relative position therebetween), or a current relative position with respect to a previous relative position.

As part of the GPS, each SV continuously transmits a navigation signal, i.e., SV position signal, containing navigation message data such as, for example, time of transmission, satellite clock data, and ephemeris data. The navigation signal is broadcast over two separate carrier signals, denoted as $L_1$ and $L_2$, each of which is modulated by a separate pseudorandom digital code that is unique to the SV from which it is transmitted. For conventional GPS navigation, a GPS receiver typically tracks at least four SV's, establishing synchronism with the SVs' transmitted navigation signal by way of a local clock at the receiver, and recovers the navigation message data.

GPS receivers typically derive two types of measurements from the received GPS signals, referred to as "code measurements" and "carrier measurements." For example, the pseudorandom digital code signals recovered by the GPS receiver can be used to provide code measurements including a measure of the distance to each SV, i.e., pseudorange measurement. This is not necessarily the same as actual range to the SV because of the lack of time clock synchronism between the satellite and the GPS receiver, which can be virtually eliminated by using multiple SV pseudorange measurements to correct for lack of clock synchronism. Further, in contrast to using pseudorandom digital code signals to provide pseudorange measurements, similar measurements may also be recovered using measurements of carrier phase made by the GPS receiver which typically provide for more accurate pseudorange measurements, or by other methods such as carrier-smoothed code-based pseudorange. In the case of carrier phase based measurements, accurate knowledge of the phase within a single wavelength is available, however, an unknown integral number of carrier signal wavelengths, the phase ambiguity, between a GPS SV and GPS receiver antenna exists, and must be resolved. The resolution of the ambiguity, including the resolution of any clock error between GPS SVs and GPS receivers, is not addressed herein and is assumed to be corrected by one of any number of methods for correcting such ambiguity available in the art.

Typical GPS receivers for tracking a GPS satellite generally require synchronization with and demodulation of the carrier signal and codes from the GPS signals received. In most designs, a correlation process establishes carrier and code tracking loops that align selected GPS carrier and code signals with corresponding replica carrier and code signals generated within the receiver to recover code measurements and carrier measurements.

For illustration, a receiver measures pseudorange, i.e., range from an antenna to an SV, by measuring phase shift between the GPS code signals and the receiver replica code signals. Such phase shift is representative of transit time and therefore a pseudorange measurement.

For attitude determination, multiple antenna/receiver sets with the antennas at fixed vehicle body locations are used. Then, differential carrier phase measurements can be made for multiple antennas with respect to a single SV. This differential measurement process eliminates the time effect (attributable to the SV), so that only the relative position effect (attributable to the multiple antennas) remains. For example, by using carrier phase measurements of the GPS signal received from an SV at two antenna/receiver sets, a differential carrier phase measurement representative of the relative position of one of the antennas with respect to the other antenna can be made.

With the use of differential measurements, measuring and processing of the relative position measurements for GPS signals received at three or more non-collinear antennas for at least two GPS SV's are used for the generation of attitude vectors required for providing full three dimensional attitude determination. For a vehicle having three antennas at fixed locations, the attitude determination using such differential carrier phase measurements represents the attitude of a plane define by the antennas.

In typical GPS attitude determination systems, such as aircraft, four antenna/receiver sets are utilized for redundancy purposes. Three of the four antennas of the antenna/receiver sets are used to define the plane for which attitude determination can be performed. Further, these antenna/receiver sets typically track more than five SVs which further provides redundancy to the computation of attitude.

Multipath reflections are the major error contributor to GPS attitude determination systems and differential position determination systems. Multipath can decrease the accuracy of such systems by an order of magnitude or more. Multipath errors in the computation of attitude occur as a result of such multipath errors being present in one or more of the carrier phase measurements utilized in such computations. Multipath errors arise because the direct path GPS signal arrival at the GPS antenna/receiver set is corrupted by associated multipath signals that arrive slightly later after reflecting from nearby reflecting surfaces. One significant source of multipath reflections, for example, is the location of reflecting surfaces near or below the horizon view of the GPS antenna.

The removal of multipath errors in the computation of positions using GPS is necessary to increase the accuracy of GPS position determination systems, including attitude determination systems. The present invention addresses the multipath problem and others as will be readily apparent to one skilled in the art from the description of the present invention as set forth in detail below.

SUMMARY OF THE INVENTION

The present invention utilizes a code pseudorange minus carrier pseudorange difference to determine the presence of multipath affecting the code pseudorange measurement. It further relies on the correlation between when the effects of multipath on both code pseudo range and carrier phase measurements occur to predict that multipath affecting code pseudorange measurements is likely to affect carrier phase measurements.

A multipath detection method in accordance with the present invention for use in a GPS position determination system includes providing a code pseudorange measurement representative of a range of an antenna to a space vehicle and a carrier phase pseudorange measurement representative of the range of the antenna to the space vehicle. A code-carrier measurement difference is then generated between the code pseudorange measurement and the carrier phase pseudorange measurement. This code-carrier measurement difference is examined to determine if a multipath component is present.

In one embodiment of the method, the examination is performed by extracting an estimated multipath component from the code-carrier measurement difference, if present. Further, the code-carrier measurement difference includes components of at least one of ionospheric error, random noise and multipath. The extraction may be performed by bandpass filtering the code-carrier difference to detect a multipath component, if present.

In another multipath detection method in accordance with the present invention for use in a GPS attitude determination system, the GPS attitude determination system for computing attitude solutions includes three or more antennas receiving signals from at least two space vehicles. A code pseudorange measurement representative of a range of one of the three or more antennas to a space vehicle is provided along with a carrier phase pseudorange measurement representative of the range of the one antenna to the space vehicle. A code-carrier measurement difference between the code pseudorange measurement and the carrier phase pseudorange measurement is then generated. The presence of multipath signals associated with the carrier phase pseudorange measurement is indicated by using the code-carrier measurement difference, i.e., the code-carrier measurement difference exposes (predominantly) the code multipath error which is indicative of carrier multipath error. The use of the one antenna and the space vehicle are avoided in computing an attitude solution if a multipath component of the code-carrier measurement difference is detected.

In one embodiment of the method, a post-update measurement residual is provided corresponding to each set of two antennas and a space vehicle used for computation of an attitude solution. Code-carrier measurement differences are generated for two antennas and a space vehicle in a particular set only if the post-update measurement residual corresponding to the set exceeds a measurement residual threshold.

In another embodiment of the method, use of an antenna and space vehicle can be avoided in the computation of an attitude solution only if the antenna and space vehicle are not necessary to enable the computation to be performed.

A multipath detection system in accordance with the present invention for use in GPS attitude determination is also provided. The system includes at least three antennas for receiving signals from at least two space vehicles. The system further includes the capability of generating a code-carrier measurement difference between a code pseudorange measurement representative of a range of an antenna to a space vehicle and a carrier phase pseudorange measurement representative of the range of the antenna to the space vehicle and also of examining the code-carrier measurement difference to determine if a multipath component of the code-carrier measurement difference is present.

DETAILED DESCRIPTION OF THE EMBODIMENTS

Figure 1:
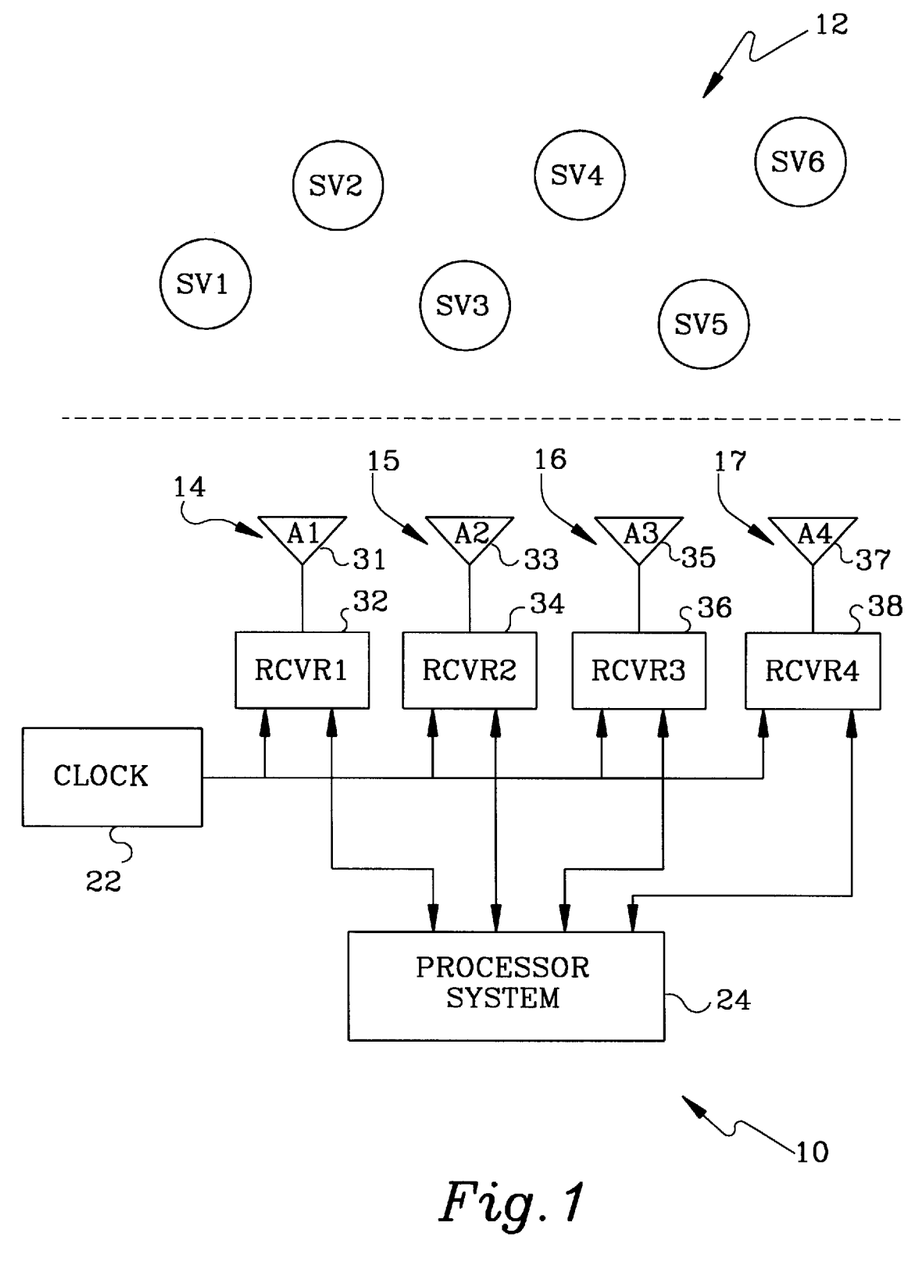
FIG. 1 is a block diagram of a GPS attitude determination system including a processor system for carrying out the present invention; the GPS attitude determination system is shown relative to satellites, i.e., SVs, of the GPS.
Figure 2:
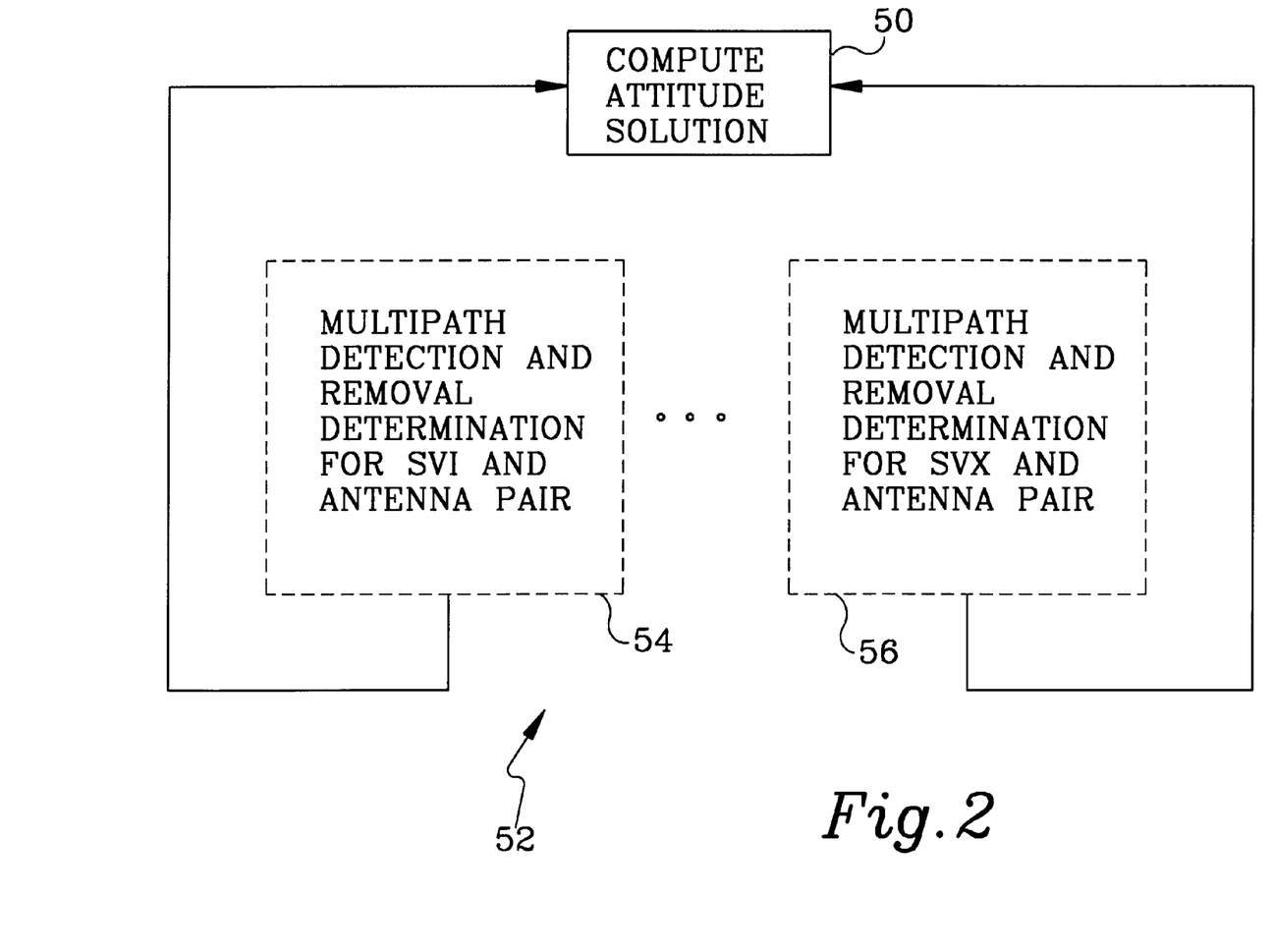
FIG. 2 is a general flow diagram illustrating the multipath detection and avoidance method in accordance with the present invention.
Figure 3:
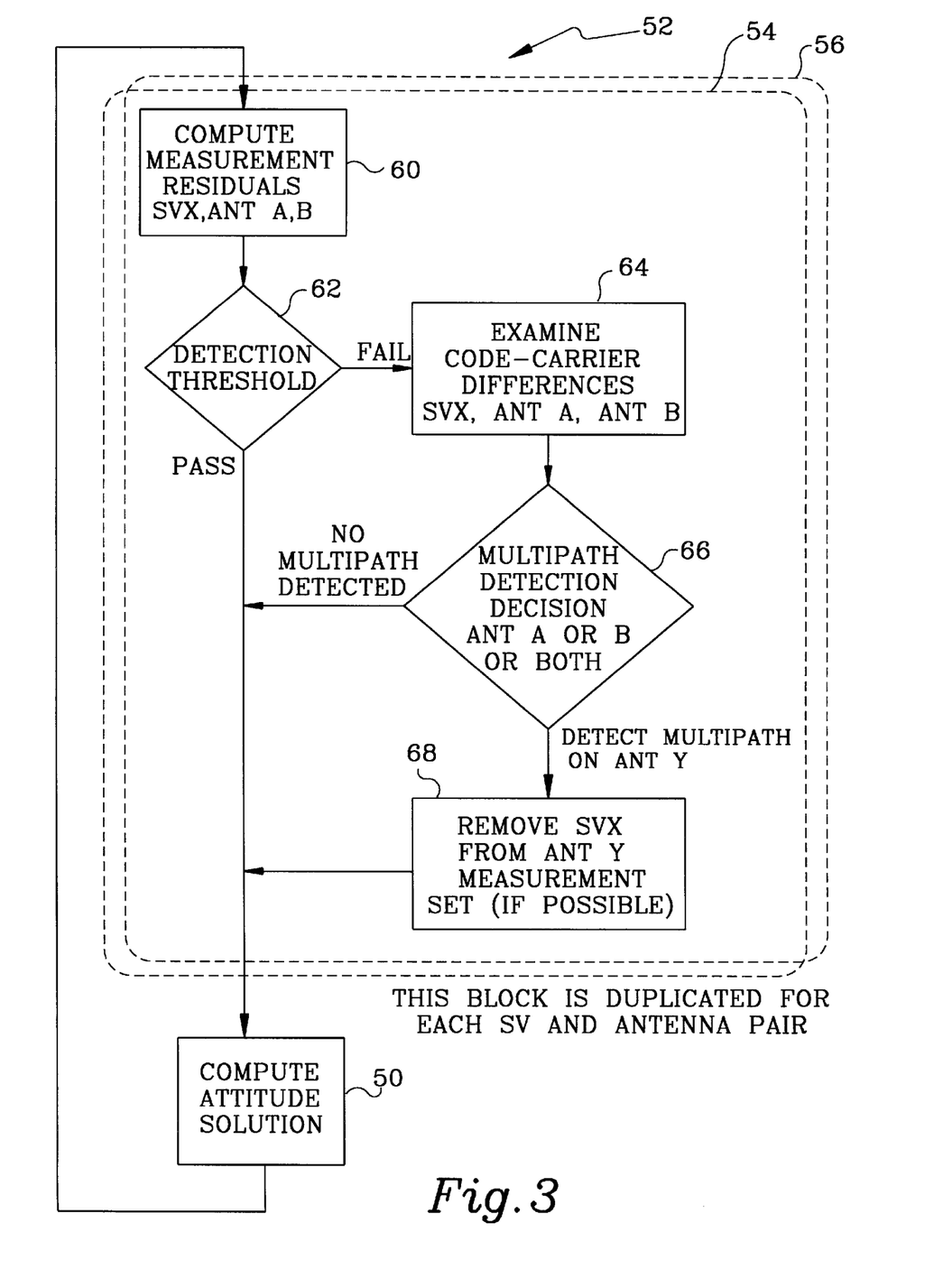
FIG. 3 is a more detailed flow diagram of the multipath detection and avoidance method shown in FIG. 2 for detecting and avoiding multipath for the four antenna/receiver GPS attitude determination system as shown in FIG. 1.

The present invention shall be described with reference to FIGS. 1–6. A GPS attitude determination system 10 for carrying out the multipath detection and avoidance method 52 as shown in FIG. 2, and further in detail in FIG. 3, is shown in FIG. 1. The GPS attitude determination system 10 is shown illustratively in conjunction with six satellites, i.e., SVs 12, which as known to one skilled in the art, orbit the earth while providing GPS signals for use by GPS systems, such as GPS attitude determination system 10, to generate attitude information for a vehicle, such as, for example, attitude for an aircraft.

The system 10 includes four separate antenna/receiver sets 14–17 although it is possible that the GPS receivers could be a channelized single receiver, and further, any number of antenna/receiver sets may be used. Each of the antenna/receiver sets 14–17 include an antenna 31, 33, 35, 37, such as an omnidirectional antenna, #501 antenna available from NovAtel (Canada), a low profile antenna and preamplifier #16248-50 available from Trimble Navigation Ltd., an active antenna #AN150 available from Canadian Marconi Company (Canada), or any other antenna suitable for receiving GPS signals from the SVs. Further, each of the antenna/receiver sets 14–17 include a GPS receiver 32, 34, 36, 38 connected to the respective antenna 31, 33, 35, 37 of the set and suitable for receiving the GPS signals from the respective antenna and for generating code pseudorange measurements and carrier phase measurements from the GPS signals as received. Such GPS receivers may include #MET 5000 available from NovAtel (Canada), a TANS Vector receiver available from Trimble Navigation Ltd., an ALLSTAR CMT-1200 available form Canadian Marconi Company (Canada), or any other suitable GPS receiver. Antenna/receiver set 14 includes antenna 31 (A1) and receiver 32 (R2); antenna/receiver set 15 includes antenna 33 (A2) and receiver 34 (R2); antenna/receiver set 16 includes antenna 35 (A3) and receiver 36 (R3); and antenna/receiver set 17 includes antenna 37 (A4) and receiver 38 (R4).

Each of the receivers 32, 34, 36 and 38 are provided with a clock 22 for synchronization with the clocks of the SVs to recover information from the GPS signals. The clock 22 may be a single clock provided to each GPS receiver, separate clocks provided to each GPS receiver, or one or more clocks provided to one or more receivers. Information generated by the receivers 32, 34, 36 and 38 is provided to processor system 24. Such information, for example, carrier phase measurements, are used by the processor system 24 to generate the desired output, such as attitude. The processor system 24 also controls the operation of the receivers 32, 34, 36 and 38.

The processor system 24 is suitable for carrying out the multipath detection and avoidance method 52 as generally shown in FIG. 2. Generally, attitude solutions are computed (Block 50) using at least three antenna/receiver sets available for such computation. As further described below, the attitude solutions computed using at least three antenna/receiver sets includes the use of measurements made from multiple SVs. For example, in most cases with respect to aircraft, measurements from two or three SVs are utilized for computation of attitude solutions. However, measurements from more than three SVs may be used. Further, it should be readily apparent that attitude of a vehicle is not limited to aircraft attitude. Determination of attitude for other vehicles, such as land based vehicles, space vehicles or any other vehicles is contemplated in accordance with the present invention.

Typically, GPS attitude determination systems, such as system 10, have at least four antennas and track at least six SVs at each antenna. Since attitude determinations or computations generally require only three non-collinear antennas and two reasonably space SVs, then the availability of redundant observables, i.e., pseudorange measurements, normally allows for elimination or avoidance of observables or pseudorange measurements affected by multipath reflections resulting in multipath errors in such measurements.

Such multipath errors can be detected by generating and examining a difference measurement between a pseudorange measurement generated using code from an SV by a GPS antenna/receiver set and a pseudorange measurement generated using carrier phase by the GPS antenna/receiver set with respect to the same SV, i.e., both the measurements being with regard to the same antenna and the same SV (shown generally as Block 52, including the separate Blocks 54 and 56 for each SV and antenna pair which provides carrier phase measurements for use in differential carrier phase measurements). Such code-carrier difference measurements expose the likely presence of multipath errors because of the correlation of the manner in which multipath reflections affect code measurements differently than carrier measurements. Typically, multipath errors of carrier measurements are about one hundred times smaller than multipath errors affecting code measurements. However, multipath errors of carrier phase measurements are generally considered the errors that determine GPS attitude accuracy. As such, the code-carrier measurement difference can be used to detect the presence of multipath errors affecting code measurements with are directly correlated with such multipath errors likely being present with respect to carrier phase measurements. The SV and antenna used in generating the carrier phase measurements likely to have multipath errors present can then be eliminated or avoided when calculating attitude solutions because of the number of redundant observable measurements available. However, such elimination of the SV and antenna is only possible if the remaining components of the GPS attitude determination system are enabled to compute the attitude solution without the use of the SV and antenna. In other words, they can be eliminated only if redundancy is truly available.

The attitude solutions computed using at least three antenna/receiver sets can be calculated (Block 50) in the following manner by determining the relative positions of each antenna of at least three antenna/receiver sets with respect to the others by using differential carrier phase measurements of the GPS signal using carrier phase measurements from the various SVs and antenna pairs available which are not affected by multipath errors as determined by the present invention. As previously discussed, this specification assumes that any unknown phase ambiguities have been resolved in a manner known to those skilled in the art. Once the necessary differential carrier phase measurements are calculated for each antenna of the antenna/receiver sets relative to the other antennas of the antenna/receiver sets, the attitude of the plane defined by the antennas of the at least three antenna/receiver sets can be determined using the algorithms described below.

For example, attitude may be computed using antenna/receivers sets 14–17. The receivers of the antenna/receiver sets 14–17 are used to generate carrier phase measurements of the GPS carrier signals received by the antennas, respectively, from multiple SVs, such as SV1–6. The carrier phase measurements are then used by the processor system 24 to generate the differential carrier phase measurements representative of the relative position of one of the antennas with respect to others, i.e., the antenna 31 of antenna/receiver set 14 relative to the antenna 33 of antenna/receiver set 15, for one of the SVs, i.e., SV1. All the other relative positions possible between the antennas of the group of antenna/receiver sets 14–17 with respect to SV1 are also determined. The differential carrier phase measurements are then determined for this same group of antenna/receiver sets 14–17 with respect to the other SVs, i.e., SV2–6. Following the determination of all the relative positions possible between the antennas of the antenna/receiver sets 14–17, an attitude solution can be generated. In other words, multiple GPS satellites and more than two GPS antenna are required for full three dimensional attitude computation. However, because many SVs are being tracked (SV1–6) and redundant antenna/receiver sets are used, redundant carrier phase measurements are available such that elimination of some of the carrier phase measurements likely to contain multipath errors as determined in accordance with the present invention can be eliminated increasing the accuracy of the attitude determination.

Using the differential carrier phase measurements, absolute attitude can be determined in the following manner. The following equation, Equation 1, represents the relationship between the GPS differential carrier phase measurements to the GPS SV line of sight vectors. This data is transformed into the proper reference frame by the attitude direction cosine matrix $A_I^B$, which transforms inertial frame vectors into body frame vectors, i.e., the body frame vectors being the vectors fixed in the vehicle body frame which rotate with the vehicle in the inertial frame. The attitude matrix is the unknown element of the equation, as all other data is known or measurable.

$$\Delta \Phi_{MN_i} = \frac{2\pi}{\lambda} \left\{ \vec{L}_{MN_B} \cdot \left\{ A_I^B \left( \frac{I_{\vec{r}_I} SV_i - I_{\vec{r}_I} B}{\left\| I_{\vec{r}_I} SV_i - I_{\vec{r}_I} B \right\|} \right) \right\} \right\} \quad \text{Equation 1)}$$

where:

$\Delta \phi$ is the measured GPS differential carrier phase measurement between two antennas, $M, N$ are any two antennas, $i$ is the GPS satellite index, $\vec{L}_B$ is the baseline vector between antennas in the body reference frame, $B$ is the body reference frame, $I$ is the inertial reference frame, $A_I^B$ is the attitude matrix, transforming inertial to body frame.

$I_{\vec{r}_I} SV_i$ is the vector from the inertial origin to the GPS SV in inertial coordinates.

$I_{\vec{r}_I} B$ is the vector from the inertial origin to the body in inertial coordinates, and $\lambda$ is the GPS signal wavelength.

The solution to this equation is determined by first assembling the measured data into appropriate arrays based upon the tracked GPS SVs, i.e., such as, for example, SV1–6, and the antennas of three antenna/receiver sets, i.e., such as, for example, antenna/receiver sets 14–16.

With the ratio of the difference of the SV vector to the antenna body frame origin vector over the difference's magnitude being written as shown in Equation 2, then Equation 1 can be written as shown below in Equation 3.

$$B_{\vec{r}_I} SV_i = \left[ \frac{I_{\vec{r}_I} SV_i - I_{\vec{r}_I} B}{\left\| I_{\vec{r}_I} SV_i - I_{\vec{r}_I} B \right\|} \right] \quad \text{Equation 2)}$$

where: $B_{\vec{r}_I} SV_i$ is the unit vector from the body frame origin to the GPS SV in inertial reference frame coordinates.

$$\Delta \Phi_{MN_i} = \frac{2\pi}{\lambda} \left\{ \vec{L}_{MN_B} \cdot \left( A_I^B B_{\vec{r}_I} SV_i \right) \right\} \quad \text{Equation 3)}$$

$$= \frac{2\pi}{\lambda} \left\{ \begin{array}{l} L_{MN_{Bx}} \cdot \left( A_{I\,11}^B B_{\vec{r}_{I_x}} SV_i + A_{I\,12}^B B_{\vec{r}_{I_y}} SV_i + A_{I\,13}^B B_{\vec{r}_{I_z}} SV_i \right) \\ L_{MN_{By}} \cdot \left( A_{I\,21}^B B_{\vec{r}_{I_x}} SV_i + A_{I\,22}^B B_{\vec{r}_{I_y}} SV_i + A_{I\,23}^B B_{\vec{r}_{I_z}} SV_i \right) \\ L_{MN_{Bz}} \cdot \left( A_{I\,31}^B B_{\vec{r}_{I_x}} SV_i + A_{I\,32}^B B_{\vec{r}_{I_y}} SV_i + A_{I\,33}^B B_{\vec{r}_{I_z}} SV_i \right) \end{array} \right\}$$

It should be noted that the use of the differential carrier phase measurement in Equation 3 should not include any receiver clock error. Clock error is a result of unavoidable error in a GPS receiver's oscillator which will add directly to all measured pseudo ranges. If this clock error has not been removed in the cycle ambiguity resolution process then it should be removed before Equation 3 is used. The clock error may be resolved using any method for correcting for such errors as known to those skilled in the art. For example, the clock error may be removed by solving the standard GPS position Equation 4, then $\Delta\Phi = \Delta\Phi' - \text{clock}$.

$$\begin{bmatrix} dx \\ dy \\ dz \\ \text{clock} \end{bmatrix} = k \Delta \Phi' \quad \text{Equation 4)}$$

where:

$\Delta\Phi'$ does not have the clock error removed, $k = (H^T H)^{-1} H^T$ $$H = \begin{bmatrix} B_{\vec{r}_{I_x}} SV_i & B_{\vec{r}_{I_y}} SV & B_{\vec{r}_{I_z}} SV & 1 \\ \vdots & \vdots & \vdots & \vdots \end{bmatrix}$$

Equation 3 can be written with respect to all tracked SV's and antennas, i.e., pairs of antennas of which the relationship is being determined, as Equation 5.

$$\begin{bmatrix} \frac{\lambda}{2\pi}\Delta\Phi_{MNi} \\ \frac{\lambda}{2\pi}\Delta\Phi_{MNj} \\ \frac{\lambda}{2\pi}\Delta\Phi_{MNk} \\ \vdots \\ \frac{\lambda}{2\pi}\Delta\Phi_{MPi} \end{bmatrix} = \begin{bmatrix} L_{MN_{Bx}}B_{\hat{r}_{1x}}SV_i L_{MN_{Bx}}B_{\hat{r}_{1y}}SV_i L_{MN_{Bx}}B_{\hat{r}_{1z}}SV_i L_{MN_{By}}B_{\hat{r}_{1x}}SV_i L_{MN_{By}}B_{\hat{r}_{1y}}SV_i L_{MN_{By}}B_{\hat{r}_{1z}}SV_i L_{MN_{Bz}}B_{\hat{r}_{1x}}SV_i L_{MN_{Bz}}B_{\hat{r}_{1y}}SV_i L_{MN_{Bz}}B_{\hat{r}_{1z}}SV_i \\ L_{MN_{Bx}}B_{\hat{r}_{1x}}SV_i L_{MN_{Bx}}B_{\hat{r}_{1y}}SV_i L_{MN_{Bx}}B_{\hat{r}_{1z}}SV_i L_{MN_{By}}B_{\hat{r}_{1x}}SV_i L_{MN_{By}}B_{\hat{r}_{1y}}SV_i L_{MN_{By}}B_{\hat{r}_{1z}}SV_i L_{MN_{Bz}}B_{\hat{r}_{1x}}SV_i L_{MN_{Bz}}B_{\hat{r}_{1y}}SV_i L_{MN_{Bz}}B_{\hat{r}_{1z}}SV_i \\ L_{MN_{Bx}}B_{\hat{r}_{1x}}SV_i L_{MN_{Bx}}B_{\hat{r}_{1y}}SV_i L_{MN_{Bx}}B_{\hat{r}_{1z}}SV_i L_{MN_{By}}B_{\hat{r}_{1x}}SV_i L_{MN_{By}}B_{\hat{r}_{1y}}SV_i L_{MN_{By}}B_{\hat{r}_{1z}}SV_i L_{MN_{Bz}}B_{\hat{r}_{1x}}SV_i L_{MN_{Bz}}B_{\hat{r}_{1y}}SV_i L_{MN_{Bz}}B_{\hat{r}_{1z}}SV_i \\ \vdots \\ L_{MN_{Bx}}B_{\hat{r}_{1x}}SV_i L_{MN_{Bx}}B_{\hat{r}_{1y}}SV_i L_{MN_{Bx}}B_{\hat{r}_{1z}}SV_i L_{MN_{By}}B_{\hat{r}_{1x}}SV_i L_{MN_{By}}B_{\hat{r}_{1y}}SV_i L_{MN_{By}}B_{\hat{r}_{1z}}SV_i L_{MN_{Bz}}B_{\hat{r}_{1x}}SV_i L_{MN_{Bz}}B_{\hat{r}_{1y}}SV_i L_{MN_{Bz}}B_{\hat{r}_{1z}}SV_i \end{bmatrix} [A]_{9\times 1}$$

Equation 5)

$$\text{where:} \quad [A]_{9\times 1} = \begin{bmatrix} A^B_{I\,11} \\ A^B_{I\,21} \\ A^B_{I\,31} \\ A^B_{I\,21} \\ A^B_{I\,22} \\ A^B_{I\,23} \\ A^B_{I\,31} \\ A^B_{I\,32} \\ A^B_{I\,33} \end{bmatrix}$$

and where: $[A]_{9\times 1}$ is the attitude matrix $[A]$, which has three rows and three columns written in vector form.

Therefore, Equation 1 has now been represented as a linear equation with the attitude direction cosine matrix listed as a nine element vector in Equation 5 that can be solved using the least squares method. The nine element vector in Equation 5 can then be represented using symbols as shown in Equation 6.

$$[\Delta\Phi]=[LR][A]_{9\times 1} \quad \text{Equation 6)}$$

The solution to Equation 6 is found by forming a pseudo-inverse of the [LR] matrix such that the following Equation 7 is derived.

$$[A]_{9\times 1}=([LR]^T[LR])^{-1}[LR]^T[\Delta\Phi] \quad \text{Equation 7)}$$

where:
T is the matrix transpose, and
−1 is the matrix inverse.

To solve for this attitude solution, a 9×9 matrix inversion is required. Equation 7, therefore, represents the solution to determine vehicle attitude based upon GPS differential carrier phase measurements and line of sight vectors to the tracked GPS SVs. Because the attitude matrix $[A]_{3\times 3}$ is a special type of matrix, particularly an orthonormal matrix, Equation 7 itself does not guarantee that a proper direction cosine matrix is formed. The matrix determined by Equation 7 should be orthonormalized such that the end result represents a proper direction cosine matrix.

In the specific case of only two GPS SVs visible and tracked by three GPS antennas, only six unique measurements are available for attitude determination. This is insufficient to solve for all nine elements of the $[A]_{9\times 1}$ matrix. In this specific case, Equation 7 is solved for only six elements of $[A]_{9\times 1}$ (the first two rows) and the remaining three elements (third row) is solved for by computing a vector cross product of the first two rows to form the third row ($\vec{row}_3 = \vec{row}_1 \times \vec{row}_2$). Again the resulting 3×3 matrix should be orthonormalized to ensure it represents a proper direction cosine matrix.

Although only two GPS SVs are technically required to determine three dimensional vehicle attitude, typically three or four GPS SVs are required to determine an antenna position, $B_{\vec{r}1}SV_i$, by GPS only systems. In the case of an inertial navigation system, or similar navigation aid, being available, the position solution from such systems may be used as the $B_{\vec{r}1}SV_i$ value and again only two GPS SVs are required to compute the GPS attitude solution.

In addition to computing attitude solutions using differential carrier phase measurements, absolute attitude can be generated using a position vector method and perturbation attitude methods can also be performed as described in copending application, entitled "Attitude Determination Method and System" (Docket No. H16-16380) filed on even day herewith, and entirely incorporated by reference herein.

The attitude of the vehicle is described in terms of a direction cosine matrix (a nine element matrix), where this matrix is used to transform a three element vector from one reference frame to another in the above attitude solution method. However, these equations can be similarly derived for a four parameter quaternion or using Euler's angles which could also be used to represent vehicle attitude.

In conjunction with the above attitude computation, illustration of the computation of measurement residuals for use as described with reference to FIG. 3 below is generally described. Using Equations 6 and 7, post update measurement residuals at time K are computed by first computing $A_k$ using Equation 6 as $A_k=([LR]_K^T[LR]_K)^{-1}[LR]_K^T\Delta\Phi_K$ where $\Delta\Phi_K$ was measured by the GPS system 10 using carrier phase measurements recovered by the receivers thereof. The computed $A_K$ can then be used to reevaluate the $\Delta\Phi$measurement by computing $\Delta\hat{\Phi}K$ i.e., the expected $\Delta\Phi_K$ based on the new $A_K$ solution using $\Delta\hat{\Phi}_K=[LR]_K A_K$. Then the difference $\Delta\Delta\Phi=\Delta\Phi_K-\Delta\hat{\Phi}_K$ is the post update measurement residual for one differential carrier phase measurement pro vided using the carrier phase measurements of a pair of antenna/receiver sets with respect to one SV.

In a perfect world, $\Delta\Delta\Phi_K$ would be zero. Because of measurement errors that are present on $\Delta\Phi$, it is not zero and can be used in conjunction with the multipath detection method 52 to determine and isolate the existence of multipath affecting an SV and antenna measurement. Such global charge to post-update measurement residuals are available on a one measurement residual per set of one SV and two antennas, as used to generated a differential carrier phase measurement for use in computing attitude solution. For example, if measurements from six SVs are utilized to determine attitude using three antenna/receiver sets, then at least two post-update measurement residuals for each SV are available, i.e., two residuals corresponding to the two pairs of antennas used with respect to a SV for generating the necessary differential carrier phase measurements representative of the relative position of each antenna relative to the other of the three antenna/receiver sets.

With post-update measurement residuals computed for each SV and antenna pair used for generating the possible differential carrier phase measurements, these post-update measurement residuals can be compared to a measurement residual threshold as described below with reference to FIG. 3. The comparison indicates the possible existence of multipath errors with respect to the particular SV and antenna pair. Therefore, the generation of and examination of code-carrier measurement differences for SVs and antenna pairs can be controlled or limited to such SVs and antenna pairs for which such existence of multipath is possible as determined by the threshold comparison. On the other hand, code-carrier measurement differences may be generated and examined for all the available SVs and antenna pairs or any selected SVs and antenna pairs as desired.

With particular reference to FIG. 3, the multipath detection and avoidance method 52 shall be described using the four antenna/receiver GPS attitude determination system 10 of FIG. 1 tracking all six SVs, SV1–6. Further, the computation of attitude solutions 50 is described as being performed using differential carrier phase measurements. As shown in FIG. 3 by the dashed line boxes 54 and 56, each SV and antenna pair (SV-X, ANT-A,B) used in generation of a differential carrier phase measurement to determine the position of an antenna with respect to another antenna has a multipath detection and removal determination block, i.e., Blocks 54, 56, associated therewith. These associated blocks are for illustrating the method carried out to detect multipath with respect to the particular associated SV and antenna pair. Further, they illustrate the removal of the SV and one or both of the antennas of the antenna pair if multipath errors are detected as likely to be present for the carrier phase measurements associated with respect to each SV-antenna pair. For example, SV1 and antenna/receivers sets 14 and 15, i.e., which are used to generate a differential carrier phase measurement, has an associated multipath detection and removal determination block associated therewith; as do SV1 and antenna pair 15 and 16, SV1 and antenna pair 16 and 17, SV2 and antenna pair 16 and 17, SV3 and antenna pair 16 and 17, as well as all the other combinations possible.

The multipath detection and removal determination process for each SV and antenna pair is therefore described for simplicity purposes, with reference to one block 54 and for one SV and antenna pair, SV1 and antenna/receiver sets 14 and 15. As shown in the multipath detection process Block 52, first, the post-update measurement residual is calculated for SV1 and antenna/receiver sets 14 and 15 (Block 60) as described above. Typically, for a differential carrier phase measurement, the post-update measurement residual should be about a few millimeters. The post-update measurement residual for SV1 and antenna/receiver sets 14 and 15 is then compared to a measurement residual detection threshold (Block 62). The measurement residual detection threshold is generally fixed at about a centimeter or so for differential carrier phase measurements. If the post-update measurement residual for SV1 and antenna/receiver sets 14 and 15 fails to meet the threshold requirements, for example, in this illustration, exceeds the centimeter or so threshold, then an indication of possible multipath errors is provided with respect to the carrier phase measurements used to generate the differential carrier phase measurement for attitude determination. As such, the generation of and examination of code-carrier differences (Block 64) as described below is performed.

If the post-update measurement residual for SV1 and antenna/receiver sets 14 and 15 passes the threshold requirements, for example, in this illustration, does not exceed the centimeter or so threshold, then it is not able to conclude whether multipath errors are or are not present and the carrier phase measurements used to generate the differential carrier phase measurement for attitude determination can be used to compute attitude solutions (Block 50). As such, the generation of and examination of code-carrier differences (Block 64) is not performed.

As indicated above, if the post-update measurement residual for SV1 and antenna/receiver sets 14 and 15 fails to meet the threshold requirements, generation of and examination of code-carrier differences (Block 64) is performed. A code-carrier measurement difference is generated using the code pseudorange measurement and the carrier phase pseudorange measurement as detailed in the Equation 8 below. Code pseudorange measurements and a carrier phase pseudorange measurements can be provided for an SV and an antenna by a GPS receiver by any known technique, such as described in the reference entitled, *Global Positioning System Theory and Applications,* Parkinson et. al., American Institute of Aeronautics and Astronautics (1996), which is one of many references that describes GPS technology, performance and applications thereof and provides a background for understanding the GPS systems and measurements described herein.

For the SV1 and antenna/receiver sets 14 and 15 as used in this illustration, a code-carrier measurement difference is calculated for each pair of SV-antenna, i.e., SV1 and antenna 31 and SV1 and antenna 33. The code-carrier measurement difference is represented by Equation 8.

$$\tilde{p} - A\tilde{C}P = 2 \cdot Iono + N\lambda + \eta_p \quad \text{Equation 8)}$$

assuming: $\eta_{acp} \ll \eta_p$ where:

$\tilde{p} = \rho + \delta\rho + Iono + Tropo + SA + C + \eta_p;$ where:

$A\tilde{C}P = \rho + \delta\rho - Iono + Tropo + SA + C + N\lambda + \eta_{acp};$ and where:

-continued

| | |
|---|---|
| $\tilde{p}$ | is measured psuedo range, |
| $A\check{C}P$ | is measured ACP (Accumulated Carrier Phase; range equivalent), |
| $\rho$ | is true range, |
| $\delta\rho$ | is the satellite position error, |
| Iono | is the Ionospheric error component, |
| Tropo | is the Tropospheric error component, |
| SA | is the selective availability error component (Department of Defense-induced), |
| C | is the clock error component of both antenna/receiver set and satellite, combined, |
| N | is the carrier phase whole-cycle ambiguity, |
| $\lambda$ | is the carrier wavelength, |
| $\eta_\rho$ | is the psuedorange noise, including multipath which is its dominant component, and |
| $\eta_{acp}$ | is the carrier phase noise, including multipath limited to a few centimeters. |

Figure 4:
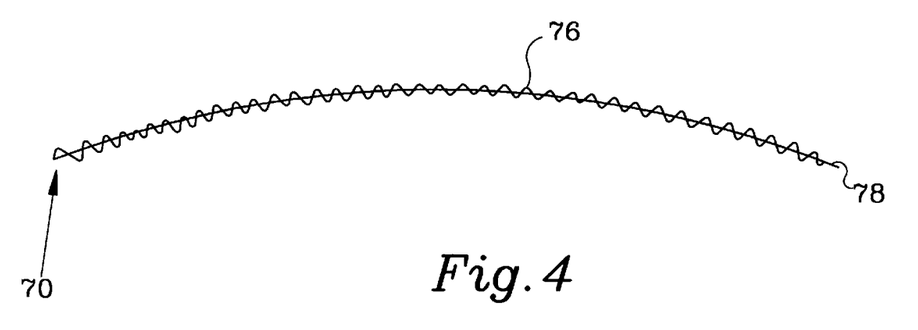
FIG. 4 is a graphical representation of the code-carrier measurement difference generated in accordance with the present invention without multipath errors present.
Figure 5:
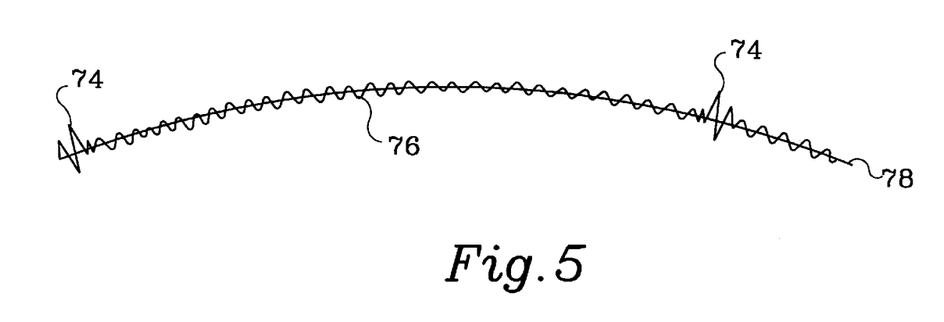
FIG. 5 is a graphical representation of the code-carrier measurement difference generated in accordance with the present invention with multipath errors present.

A graphical representation of a code-carrier measurement difference is shown in FIGS. 4 and 5. FIG. 4 is a graphical representation of a code-carrier measurement difference 70 without multipath errors being present and FIG. 5 is a graphical representation of a code-carrier measurement difference 72 with multipath errors being present.

The graphical illustrations of FIGS. 4 and 5 show the various potential components of the code-carrier measurement difference. For example, the code-carrier measurement differences 70, 72 include an ionospheric error component 78, i.e., (2)(Iono), which typically changes very slowly over time, typically 10 to 20 meters in the course of 4 to 6 hours. This change will also be smooth and will typically look parabolic over time as can be seen in the graphical illustration. The component $(N\lambda)$ is constant between cycle slips of the antenna/receiver sets phase lock loop in the generation of the carrier phase measurement and because cycle slips are generally infrequent and are easily detected by the antenna/receiver set, this component is ignored in the graphical illustrations. The code-carrier measurement differences 70, 72 further includes a component $(\eta_{acp})$ 76 which is a high frequency error component. Last, only the code-carrier measurement difference 72 includes a pseudorange noise component $(\eta_\rho)$ representative at least in part of a multipath error component 74.

Therefore, the only term of interest regarding multipath errors in the code-carrier measurement difference, i.e., which potentially includes multipath errors, is $(\eta_\rho)$. So to detect whether multipath errors are present, extraction of $(\eta_\rho)$ out of $(\rho-A\check{C}P)$ is performed and the result compared to a predetermined threshold to make a multipath detection decision (Block 66). If multipath errors are detected using either of the code-carrier measurement differences, i.e., indicating the likelihood of multipath errors in the carrier phase measurements generated therefrom, of either SV1 and antenna 31 or SV1 and antenna 33, respectively, then removal one or both of the SV-antenna pairs determined to be affected by multipath reflections is performed (Block 68) such that the affected SV-antenna pair(s) is not used for measurement purposes in computing attitude solutions (Block 50). If multipath errors are not detected using either of the code-carrier measurement differences, i.e., indicating that multipath errors are most likely not present, then removal of neither SV-antenna pair is performed and such SV-antenna pairs can be used for measurement purposes in computing attitude solutions (Block 50). However, removal of an SV-antenna pair is possible only if the attitude determination system is truly redundant, i.e., other SV-antenna pairs are sufficient for enabling computation of an attitude solution.

Figure 6:
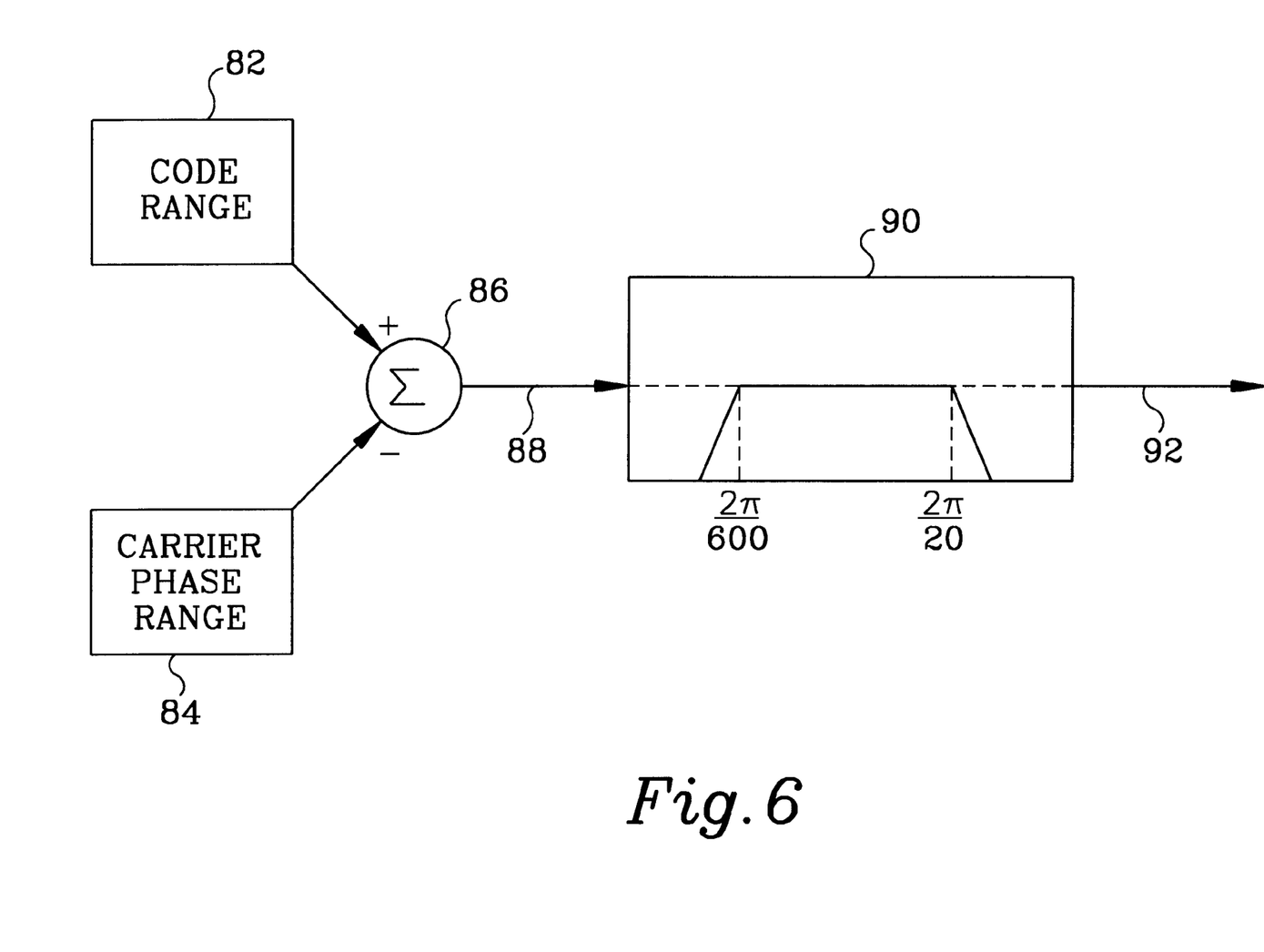
FIG. 6 is a block diagram of an examination circuit or technique for examining the code-carrier measurement difference in accordance with the present invention to extract a multipath component, if present.

One technique of extracting $(\eta_\rho)$ out of $(\rho-A\check{C}P)$ is performed by the examination schematic, i.e. a filtering technique, as described with reference to FIG. 6. As shown in FIG. 6, a code-carrier measurement difference 88 is provided to a bandpass filter 90. The code-carrier measurement difference 88 is generated by summing at summer 86 a code pseudorange measurement 82 and an inverted carrier phase pseudorange measurement 84 as provided thereto in a manner described herein and/or as know to one skilled in the art.

The code-carrier measurement difference 88 is "high passed," resetting the filter at every cycle slip. It is also necessary to reset the filter at Issue of Data Ephemeris (IODE) changes due to the jumps that pseudorange can take when IODE changes, i.e., when a new set of ephemeris data or SV orbit descriptors is loaded. These pseudorange jumps may happen because the SV clock correction term which the antenna/receiver set uses to compute code pseudorange is calculated from parameters included in the ephemeris data.

A typical value for the crossover frequency for the high pass filter is about $$\frac{2\pi}{600} \frac{\text{radians}}{\text{sec}}.$$

The output of the high pass filter will include the multipath errors, if any are present, but also some much higher frequency errors that may make multipath error detection difficult. Thus, a high frequency roll-off to the filter, i.e., making it a band pass filter, is used. The upper cutoff frequency is at about $$\frac{2\pi}{20} \frac{\text{radians}}{\text{sec}}.$$

The result is the exposure of any multipath errors in the code pseudorange measurement which directly correlates with the likely presence of multipath errors in the carrier phase pseudorange measurements. To make the determination of whether multipath is likely to be present, the result 92, i.e., the multipath discriminator, is compared to a predetermined threshold. Large values of the multipath discriminator indicate the presence of multipath errors. In relative terms, a large value is deemed to be greater than 5–15 meters for a typical attitude determination system, however, this will vary between different types of GPS receivers. Further, the frequencies given above are for illustration only and other frequencies may be suitable for filtering purposes.

The generation, examination, and removal determination process described above is performed for each SV and antenna pair which fails the detection threshold test (Block 62). SV-antenna pairs are removed until it is no longer possible to compute attitude solutions (Block 50) with the remaining SVs and antenna measurements. It should be readily apparent to one skilled in the art that the filtered code-carrier difference indication of multipath can be used separately from a method utilizing measurement residuals or in combination therewith.

Although the invention has been described with particular reference to preferred embodiments thereof, variations and modifications of the present invention can be made within a contemplated scope of the following claims as is readily known to one skilled in the art. For example, thresholds given are for illustrative purposes only, the attitude solution computations are for illustrative purposes only and other manners of computation are clearly contemplated in accordance with the present invention, and any number of antenna/receiver sets and SVs may be substituted for the illustrative embodiments described.

What is claimed is:

1. A multipath detection method for use in a GPS position determination system including a plurality of antennas for receiving signals from a plurality of space vehicles to compute position solutions, the method comprising the steps of:

providing a code pseudorange measurement representative of a range of an antenna of the plurality of antennas to a space vehicle of the plurality of space vehicles;

providing a carrier phase pseudorange measurement representative of the range of the antenna to the space vehicle;

generating a code-carrier measurement difference between the code pseudorange measurement and the carrier phase pseudorange measurement;

examining the code-carrier measurement difference to determine if a multipath component is present; and avoiding, the use of measurements generated using the antenna and the space vehicle in computing a position solution if a multipath component of the code-carrier measurement difference is detected.

2. The method according to claim 1, wherein the examination step includes extracting a multipath component from the code-carrier measurement difference, if present.

3. The method according to claim 2, wherein the code-carrier difference includes components of at least one of ionospheric error, random noise and multipath, and further wherein the extraction step includes bandpass filtering the code-carrier difference to detect a multipath component, if present.

4. A multipath detection method for use in a GPS attitude determination system, the GPS attitude determination system for computing attitude solutions includes three or more antennas for receiving signals from at least two space vehicles, the method comprising the steps of:

providing a code pseudorange measurement representative of a range of one of the three or more antennas to a space vehicle;

providing a carrier phase pseudorange measurement representative of the range of the one antenna to the space vehicle;

generating a code-carrier measurement difference between the code pseudorange measurement and the carrier phase pseudorange measurement;

detecting the potential presence of multipath signal associated with the carrier phase pseudorange measurement using the code-carrier measurement difference; and avoiding, the use of measurements generated using the one antenna and the space vehicle in computing an attitude solution if a multipath component of the code-carrier measurement difference is detected.

5. The method according to claim 4, wherein the detection step includes extracting a multipath component from the code-carrier measurement difference, if present, and comparing the multipath component to a threshold for determining if the one antenna and the space vehicle are to be avoided in computing an attitude solution.

6. The method according to claim 5, wherein the code-carrier difference includes components of at least one of ionospheric error, random noise and multipath, and further wherein the extraction step includes bandpass filtering the code-carrier difference to detect a multipath component, if present.

7. The method according to claim 4, further including the step of providing a post-update measurement residual corresponding to each set of two antennas and a space vehicle used for computation of an attitude solution, and further wherein a code-carrier measurement difference is generated only if the post-update measurement residual corresponding to a set of two antennas and the space vehicle exceeds a measurement residual threshold.

8. The method according to claim 7, wherein the code-carrier difference includes components of at least one of ionospheric error, random noise and multipath, and further wherein the detection step includes extracting a multipath component by bandpass filtering the code-carrier difference, if present, and comparing the multipath component to a threshold for determining if the one antenna and the space vehicle are to be avoided in computing an attitude solution.

9. A multipath detection method for use in a GPS attitude determination system, the GPS attitude determination system for computing attitude solutions using three or more antennas and signals from at least two space vehicles, the method comprising the steps of:

providing a post-update measurement residual corresponding to each set of two antennas and a space vehicle used for computation of an attitude solution;

comparing each post-update measurement residual to a measurement residual threshold and if the post-update measurement residual corresponding to one set of two antennas and a space vehicle exceeds the measurement residual threshold, then a code-carrier measurement difference for each antenna/space vehicle pair of the one set is generated, the code-carrier measurement difference is the difference between a code pseudorange measurement representative of a range between the antenna and space vehicle of the pair and a carrier phase pseudorange measurement representative of the range between the antenna and space vehicle of the pair;

examining any code-carrier measurement differences generated for antenna/space vehicle pairs to determine if multipath signals are present; and avoiding, the use of measurements generated using an antenna/space vehicle pair in computation of an attitude solution using the GPS attitude determination system if multipath signals are determined to be present upon examination of the code-carrier measurement difference generated for the antenna/space vehicle pair.

10. The method according to claim 9, wherein the antenna/space vehicle pair can be avoided in the computation of the attitude solution only if the antenna/space vehicle pair is not necessary to enable the computation to be performed.

11. A multipath detection system for use in GPS attitude determination, the system comprising:

at least three antennas for receiving signals from at least two space vehicles;

means for generating a code-carrier measurement difference between a code pseudorange measurement representative of a range of an antenna to a space vehicle and a carrier phase pseudorange measurement representative of the range of the antenna to the space vehicle;

means for examining the code-carrier measurement difference to determine if a multipath component of the code-carrier measurement difference is present;

means for computing attitude solutions using the at least three antennas; and means for avoiding the use of measurements generated using the antenna and the space vehicle in the computation of an attitude solution if the code-carrier difference indicates the presence of multipath signals.

12. The system according to claim 11, wherein the examination means includes means for extracting the multipath component from the code-carrier measurement difference, if present.

13. The system according to claim 12, wherein the code-carrier difference includes components of at least one of ionospheric error, random noise and multipath, and further wherein the extraction means includes a bandpass filter to generate the multipath component, if present.

14. The system according to claim 11, further including:

means for providing a post-update measurement residual corresponding to each set of two antennas and a space vehicle used for computation of attitude solutions computed using the at least three antennas and the signals from at least two space vehicles;

means for controlling the generation means by comparing each post-update measurement residual to a measurement residual threshold and if a post-update measurement residual corresponding to one set of two antennas and a space vehicle does not exceed the measurement residual threshold, then a code-carrier measurement difference for the two antennas and the space vehicle of the one set are not generated by the generation means.

* * * * *